United States Patent
Huang

(10) Patent No.: US 8,309,644 B1
(45) Date of Patent: Nov. 13, 2012

(54) METHODS OF TREATING CARBON FIBERS, FIBER-REINFORCED RESINS, AND METHODS OF MAKING THE FIBER-REINFORCED RESINS

(75) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/220,506

(22) Filed: Aug. 29, 2011

(51) Int. Cl.
*C08K 9/00* (2006.01)
*C08K 3/04* (2006.01)
*C09C 1/56* (2006.01)
*B05D 3/00* (2006.01)

(52) U.S. Cl. ..... 524/495; 524/589; 523/215; 423/447.1; 423/460; 427/212; 428/391; 8/115.6

(58) Field of Classification Search .................. 523/427, 523/215, 468; 428/367, 288, 378, 408, 364, 428/391, 405; 260/38; 427/212, 219, 444; 423/447.1, 460; 524/589, 600, 495–496; 8/115.6
See application file for complete search history.

(56) References Cited

U.S. PATENT DOCUMENTS

| 3,914,504 | A | * | 10/1975 | Weldy | 428/367 |
| 4,009,305 | A | * | 2/1977 | Fujimaki et al. | 427/399 |
| 4,880,927 | A | * | 11/1989 | Takago et al. | 544/193 |
| 5,369,143 | A | | 11/1994 | Kurimoto et al. | |
| 6,399,199 | B1 | | 6/2002 | Fujino et al. | |
| 6,444,187 | B1 | | 9/2002 | Miyoshi et al. | |
| 6,515,081 | B2 | | 2/2003 | Oosedo et al. | |
| 2006/0204763 | A1 | * | 9/2006 | Hartman et al. | 428/417 |
| 2010/0120972 | A1 | | 5/2010 | Yuan | |
| 2010/0252438 | A1 | | 10/2010 | Yoshikawa et al. | |
| 2011/0027492 | A1 | | 2/2011 | Mekala et al. | |

OTHER PUBLICATIONS

Hughes, J.D.H., "The Carbon Fibre/Epoxy Interface—A Review", Composites Science and Technology 41, (1991), pp. 13-45.
"Silane Coupling Agents", Advanced Polymer Inc., Issue 63, Revised Jan. 14, 2011, 8 pages.

* cited by examiner

*Primary Examiner* — Vasu Jagannathan
*Assistant Examiner* — Hannah Pak
(74) *Attorney, Agent, or Firm* — Dierker & Associates, P.C.

(57) ABSTRACT

A method of treating carbon fibers includes introducing a functional group to a carbon fiber surface, and reacting the functional group with a silane to incorporate a silanol moiety to the carbon fiber surface. The functional group is chosen from amine groups, carboxyl groups, hydroxyl groups, and/or carbonyl groups. Also disclosed herein are a fiber-reinforced resin and a method of making the same.

7 Claims, 4 Drawing Sheets

METHODS OF TREATING CARBON FIBERS, FIBER-REINFORCED RESINS, AND METHODS OF MAKING THE FIBER-REINFORCED RESINS

TECHNICAL FIELD

The present disclosure relates generally to methods of treating carbon fibers, fiber-reinforced resins, and methods of making the fiber-reinforced resins.

BACKGROUND

Carbon fiber is a material consisting of extremely thin fibers (e.g., ranging from about 1 nm to about 100 μm in effective diameter) of carbon atoms bound together so that the carbon atom layers are predominantly aligned parallel to the length of the fiber. Each carbon fiber tends to be strong. Parts formed from carbon fibers or containing carbon fibers often weigh less than parts that contain other materials instead of carbon fibers.

In some cases, composite materials may be formed from the combination of a matrix resin and carbon fibers. These composites are often referred to as carbon fiber-reinforced composites, and may be used in a variety of applications including aerospace applications, civil engineering applications, military applications, motor sports, and recreational/competitive sports, to name a few.

SUMMARY

A method of treating carbon fibers is disclosed herein. The method involves introducing a functional group to a carbon fiber surface. The functional group is chosen from amine groups, carboxyl groups, hydroxyl groups, carbonyl groups, and combinations thereof. The method further involves reacting the functional group with a silane to incorporate a silanol moiety to the carbon fiber surface.

Also disclosed herein are a fiber-reinforced resin and a method of making the same.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
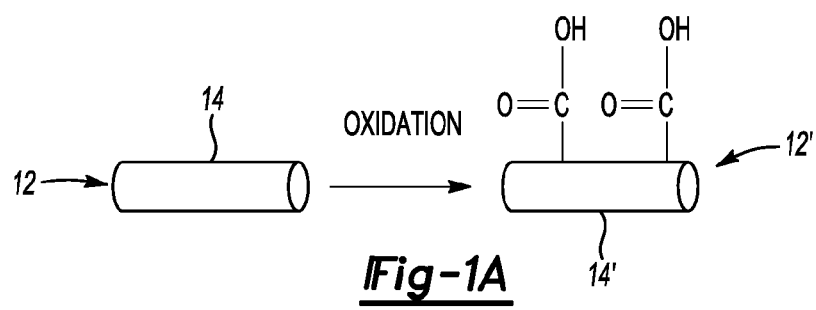
FIGS. 1A and 1B are reaction schemes that together illustrate an example of a method of treating carbon fibers, including oxidation of a carbon fiber surface (FIG. 1A) and silanization of the oxidized carbon fiber surface (FIG. 1B)

Carbon fiber-reinforced resins or composites may be formed by incorporating carbon fibers into a matrix resin. An interface is formed between each carbon fiber and the matrix resin, and the strength of the bond formed at this interface may affect mechanical properties of the carbon fiber-reinforced resin or composite material. In some instances, the bond formed at the interface is weak as a result of the carbon fiber (i.e., the resin-reinforcing material) inadequately or not adhering to the matrix resin. To improve the strength of this bond, the carbon fiber surface (which is naturally inert) may be activated (e.g., by introducing functional groups to the carbon fiber surface), and then sized using a sizing agent. The sizing agent lubricates and protects the individual carbon fibers, and further bonds the treated fiber to the matrix resin.

Current practices for carbon fiber surface activation and surface sizing are, in many cases, specific for forming carbon fiber reinforcing materials that are compatible with epoxy resins alone. Since these practices are designed to produce carbon fiber reinforcing materials that will be used in epoxy resins, the use of these materials in other resins has been limited. In order to expand the use of carbon fiber reinforcing materials in other resins, different surface activation practices (e.g., by introducing a different type of functional group to the carbon fiber surface) and/or different surface sizing practices (e.g., by utilizing different surface sizing formulation(s)) may be required.

The inventor of the present disclosure has unexpectedly and fortuitously found that carbon fibers may be treated to form a modified carbon fiber surface that resembles the surface of a glass fiber. This may be accomplished by introducing silanol moieties to the surface of the carbon fiber. The modified carbon fiber surface is activated (similar to a glass fiber) so that it can react with a variety of readily available sizing agents in order to create a desirably strong bond at an interface between each modified carbon fiber and a variety of matrix resins (e.g., other than epoxy resins). The fact that readily (e.g., commercially) available sizing agents may be used when introducing the modified carbon fibers into matrix resins obviates the need to develop other sizing agent formulations in order to introduce carbon fibers into non-epoxy based resins.

An example method for treating carbon fibers will now be described herein. The method generally involves introducing a functional group to the surface 14 of a carbon fiber 12, and then reacting the functional group with a silane to incorporate a silanol moiety on the carbon fiber surface 14. The functional group may be selected from amine groups and/or groups containing oxygen. Examples of functional groups that contain oxygen include carboxyl groups, hydroxyl groups, and carbonyl groups. In an example, the functional groups that contain oxygen may come from air, oxygen, or nitric acid during oxidative treatment at an elevated temperature. In another example, the functional groups that contain oxygen may come from plasma treatment in an oxygen-containing environment (e.g., a substantially pure oxygen environment or air). The functional groups that contain oxygen may further come from electrochemical treatment in acids (such as nitric acid or sulfuric acid), bases (such as sodium hydroxide), or other electrolyte salts. Amine functional groups may, for example, come from plasma treatment in a nitrogen-containing environment.

In examples in which oxygen-containing functional groups are used, the functional groups are introduced to the carbon fiber surface during an oxidation reaction. In these examples, the carbon fiber surface 14 is oxidized by an oxidant containing the functional group, or by virtue of the oxidation reaction, which is capable of forming the functional group. FIG. 1A shows a reaction scheme illustrating an example oxidation reaction where the carbon fiber surface 14 is oxidized by reacting the carbon fiber surface 14 with a 3:1 solution of concentrated $H_2SO_4$ and $HNO_3$, which are used as the oxidants. This reaction may be performed at any temperature, where lower temperatures may require longer reaction times and higher temperature may require shorter reaction times. In an example, the reaction may be performed at a temperature of about 90° C. for about 10 minutes. In another example, the reaction temperature ranges from about room temperature (e.g., from about 18° C. to about 23° C.) to about 100° C. Further, the reaction time ranges from about 5 seconds (e.g., at 100° C.) to about 2 days (e.g., at room temperature). In the example shown in FIG. 1A, the reaction between the carbon fiber surface 14 and the $H_2SO_4$ and $HNO_3$ oxidant solution produces an activated carbon fiber surface 14' that includes carboxyl functional group(s) (i.e., COOH) bonded to the carbon fiber surface 14.

The oxygen-containing functional group may be chemically introduced to the carbon fiber surface 14, e.g., via thermal oxidation. Thermal oxidation is a technique that may be used to oxidize the carbon fiber surface 14. This may be accomplished by reacting the carbon fiber surface 14 with oxygen-containing gas(es) (referred to as gas-phase oxidation) in the presence of heat, as shown by Reaction (1) (the carbon fiber surface is denoted as CFS in Reaction (1) below):

$$CFS+O_2 \rightarrow CFS\text{—}O_2 \qquad \text{Reaction (1)}$$

Thermal oxidation may otherwise be accomplished by reacting the carbon fiber surface 14 with liquid oxidizing agents (referred to as liquid-phase oxidation) in the presence of heat. An example of liquid-phase oxidation is shown by Reaction (2) (again, the carbon fiber surface is denoted as CFS in Reaction (2) below):

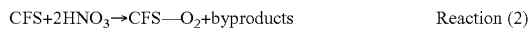

$$CFS+2HNO_3 \rightarrow CFS\text{—}O_2+\text{byproducts} \qquad \text{Reaction (2)}$$

The oxygen-containing functional group may also be electrochemically introduced to the carbon fiber surface 14. This technique generally involves the electrochemical surface treatment of the carbon fiber 12 in electrolytic baths of acid and alkaline aqueous solutions to form oxygen-containing groups on the carbon fiber surface 14. In an example, the process may be performed by immersing the carbon fiber 12 into an electrolytic bath which contains an electrolyte such as KOH, $H_2SO_4$, $HNO_3$, NaOH, and ammonium salts.

In yet another example, the functional group may be introduced to the carbon fiber surface 14 by plasma treatment in different environments, by growing whiskers on carbon fiber surfaces, or by coating the carbon fiber surface with polymers (e.g., polyamides and polyimides).

Once the functional group(s) has/have been bonded to the carbon fiber 12, a functionalized carbon fiber 12' is formed. This is shown in FIG. 1A.

Additionally, once the carbon fiber surface 14 has been functionalized (i.e., by the introduction of the functional group to the surface 14 as described above), the method of treating the carbon fiber 12 further includes silanizing the activated (or functionalized) carbon fiber surface 14' to form a silanized carbon fiber surface 14". This treatment formed the silianized carbon fiber 12" shown in FIG. 1B. In an example, silanization involves reacting the functional group(s) of the activated carbon fiber surface 14' with a silane 16 to incorporate a silanol moiety (e.g., —SiOH) on the activated carbon fiber surface 14'. As used herein, "a silane" refers to a material that contains silane groups. Examples of silanes have the formula $R_nSiR'_m$, where any of the R groups can be the same or different and may be converted to SiOH during the carbon fiber surface treatment process, n and m are integers each ranging from 1 to 3 (e.g., when n=1, m=3), and R' are chemical groups that are the same or different, and are capable of chemically reacting with the functional groups of the activated carbon fiber surface 14'. In an example, the silane includes i) silicon, ii) R chosen from an alkoxy group, a chloro group, and a bromo group, and iii) R' is a chemical group chosen from an amine group, a carboxyl group, an epoxide group, and an isocyanate group. In some cases, the chemical group (R') is an isocyanate group. It is believed that an isocyanate silane may react with the oxygen-containing groups (e.g., in the oxidation process shown in FIG. 1A, which is described below) and the amine groups (e.g., in the plasma treatment process shown in FIG. 4A, which is also described below), and these reactions may occur relatively quickly (e.g., within minutes or even seconds).

Figure 1B:
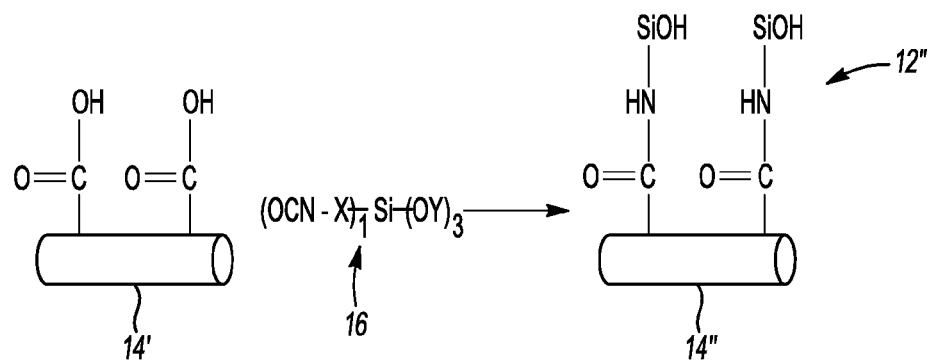

The following are some examples of the chemistry involved in the silanization reaction: i) a silane containing isocyanate groups that can react with carboxyl groups, hydroxyl groups, and amine groups on the functionalized carbon fiber surface 14'; ii) a silane having amine groups that can react with carboxyl groups on the functionalized carbon fiber surface 14', iii) a silane having carboxyl groups that can react with amine groups on the functionalized carbon fiber surface 14', and iv) a silane having epoxide groups that can react with amine groups on the functionalized carbon fiber surface 14'. An example of a reaction scheme showing the silanization of the activated carbon fiber surface 14' is shown in FIG. 1B. In this example, the silane has the generic formula described above $R_nSiR'_m$, where $R_n$ is an alkoxy group (e.g., $(-OY)_n$, where Y=a methyl group (—$CH_3$) or an ethyl group (—$C_2H_5$), and n=3) and $R'_m$ is the isocyanate group (e.g., $(-XNCO)_m$, where X=a methylene group (—$H_2C$—), an ethylene group (—$H_4C_2$—), a propylene group (—$H_6C_3$—), or a butylene group (—$H_8C_4$—) and m=1). In an example, the silane has the formula $(C_2H_5O)_3Si(CH_2)_3NCO$ (i.e., 3-(triethoxysilyl)propyl isocyanate). As depicted, the isocyanate group is very reactive with the carboxyl groups of the modified carbon fiber surface 14', resulting in silanization. Other examples of silanes that contain isocyanates include (trimethoxysilyl)propyl isocyanate, (triethoxysilyl)butyl isocyanate, (triethoxysilyl)ethyl isocyanate, (triethoxysilyl)methyl isocyanate, and the like. An example of a silane containing amine functional groups includes 3-aminopropyltriethoxysilane. Furthermore, an example of a silane containing carbonyl groups include a glycidyl (epoxide) silane, such as 3-glycidoxypropyltrimethoxysilane.

Figure 2A:
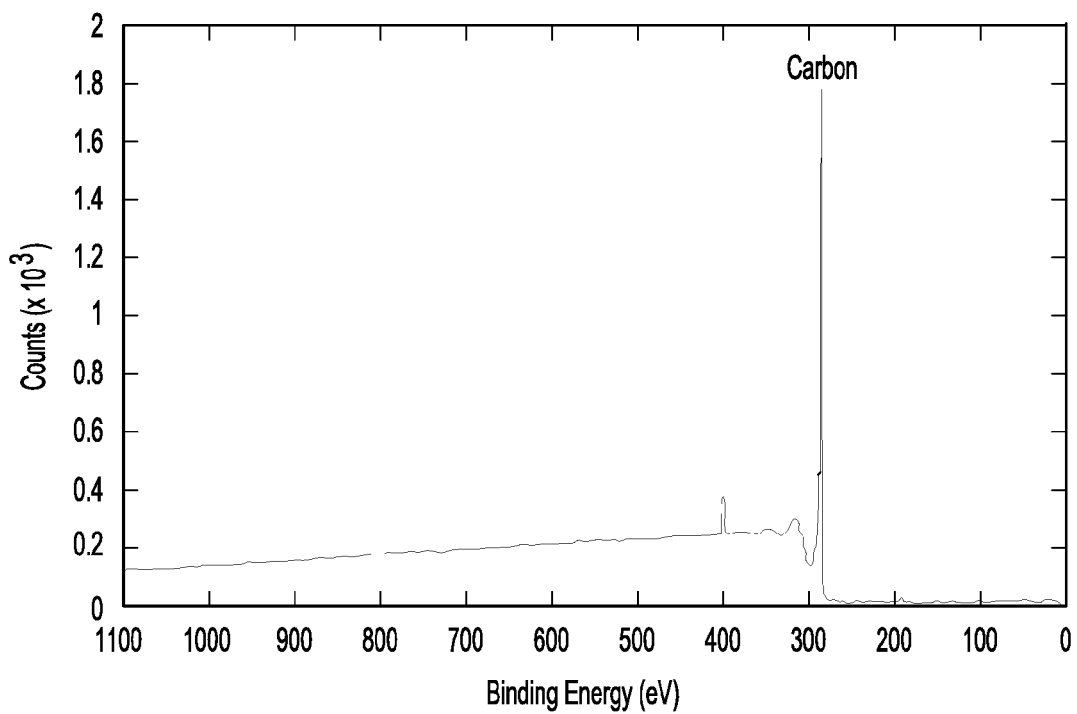
FIGS. 2A and 2B are X-ray photoelectron spectroscopy (XPS) spectra of non-treated carbon fiber surfaces (FIG. 2A) and treated carbon fiber surfaces (FIG. 2B)
Figure 2B:
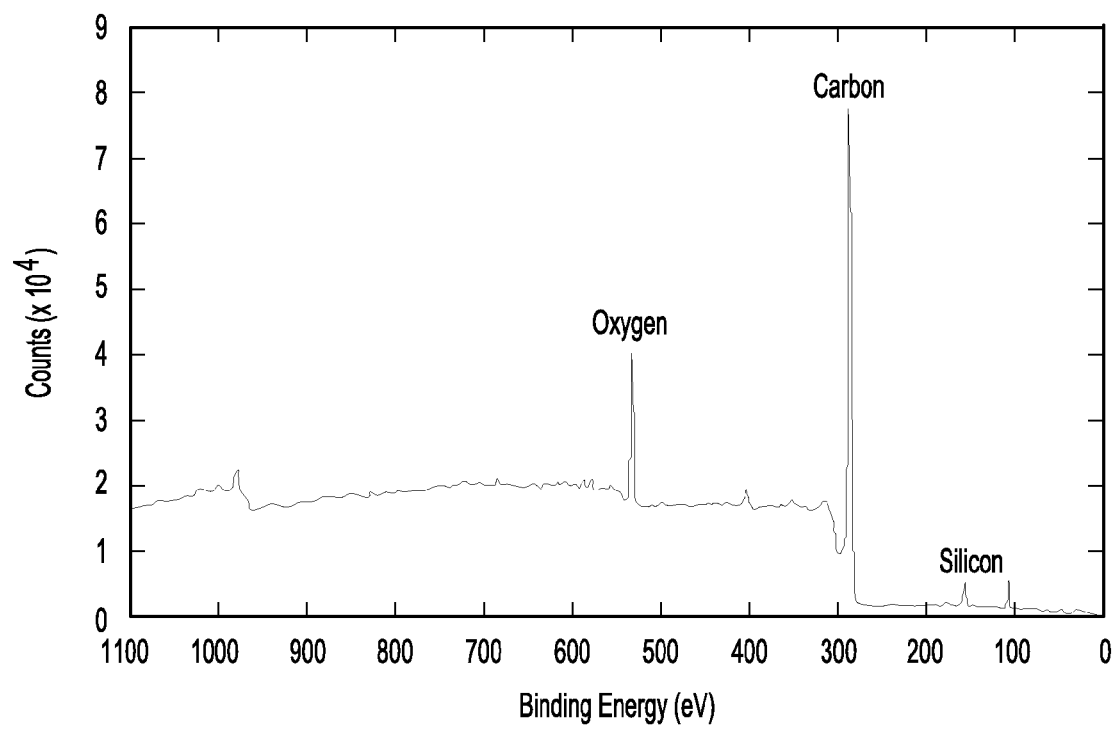

The processes shown in FIGS. 1A and 1B were performed, and the presence of the silanol moiety on the treated carbon fiber surface was verified using X-ray photoelectron spectroscopy (XPS). FIG. 2A is the XPS spectrum of non-treated carbon fiber surfaces, and FIG. 2B is the XPS spectrum of carbon fiber surfaces treated with the silanol moiety, i.e., the silanized carbon fiber surface 14" shown in the reaction scheme in FIG. 1B. The XPS spectrum of the non-treated carbon fiber surfaces clearly shows a peak at roughly 290 eV, representing the presence of carbon. The same peak (at roughly 290 eV) for carbon is shown in the treated carbon fiber surfaces in the XPS spectrum in FIG. 2B. However, the XPS spectrum of FIG. 2B also includes other peaks, e.g., one peak at roughly 530 eV, representing oxygen, and another peak at roughly 150 eV, representing silicon. These XPS spectra clearly show that the carbon fibers treated according to the method shown in FIGS. 1A and 1B were sufficiently silanized; i.e., the peak at roughly 150 eV is indicative of the presence of a silanol moiety on the carbon fiber surface 14".

Figure 3A:
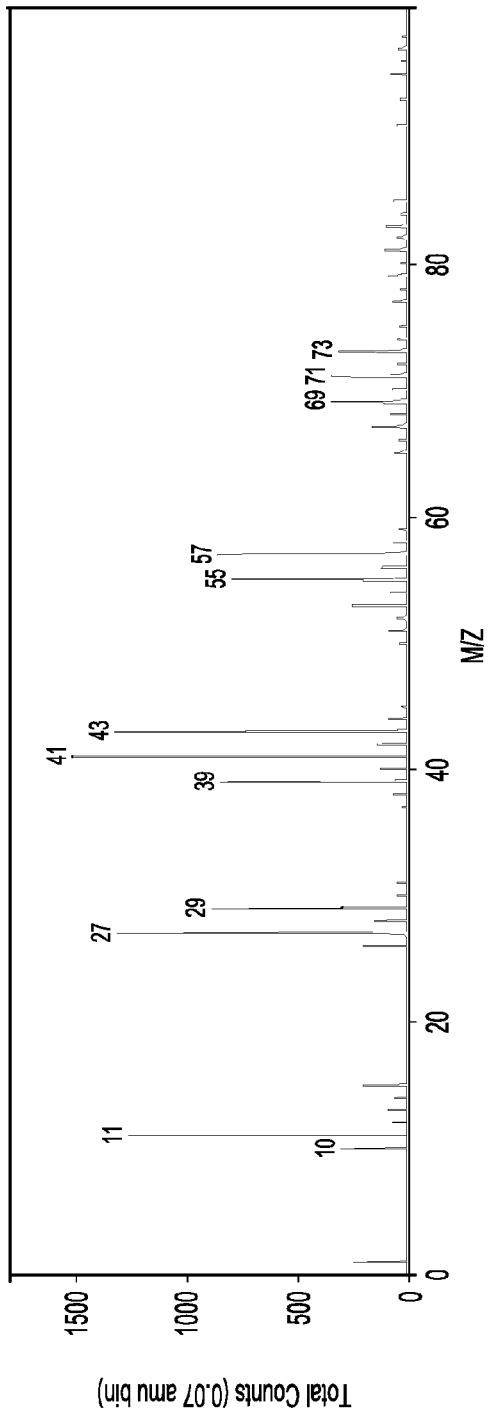
FIGS. 3A and 3B are time-of-flight secondary ion mass spectrometry (TOF-SIMS) spectra of non-treated carbon fiber surfaces (FIG. 3A) and treated carbon fiber surfaces (FIG. 3B)
Figure 3B:
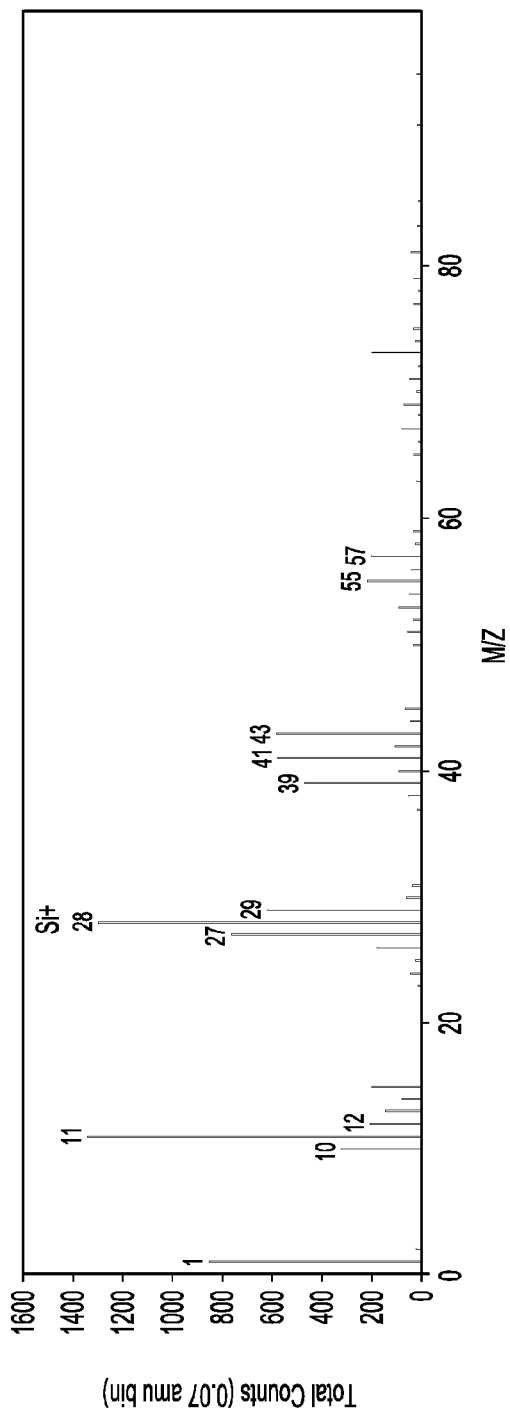

The presence of the silanol moiety on the treated carbon fiber surface 14" was also verified using time-of-flight secondary ion mass spectrometry (TOF-SIMS). FIG. 3A is a TOF-SIMS spectrum of non-treated carbon fiber surfaces, and FIG. 3B is a TOF-SIMS spectrum of treated carbon fiber surfaces treated with the silanol moiety, i.e., the carbon fiber surface 14" shown in the reaction scheme in FIG. 1B. The TOF-SIMS spectrum of the treated carbon fiber surfaces in FIG. 3B clearly shows a peak at a mass-to-charge ratio (M/Z) of 28, representing the presence of silicon. In contrast, the TOF-SIMS spectrum of the non-treated carbon fiber surfaces in FIG. 3A does not include a peak at 28, indicating the absence of silicon on the surface of the untreated carbon fibers.

As briefly mentioned above, the treated carbon fibers 12" (shown in FIG. 1B) are reactive with any sizing agents suitable for treating glass fibers due, at least in part, to the presence of the silanol moiety on the carbon fiber surface. A resin reinforcing material may be formed by reacting the treated carbon fibers 12" with the selected sizing agent. This resin reinforcing material may then be incorporated into any matrix resin to ultimately form a carbon fiber-reinforced resin.

Figure 4A:
FIGS. 4A and 4B are reaction schemes that together illustrate another example of a method of treating carbon fibers, including plasma treatment of a carbon fiber surface in a nitrogen-containing environment (FIG. 4A) and silanization of the treated carbon fiber surface (FIG. 4B)

In examples in which amine functional groups are used in the treatment of the carbon fibers, the amine groups are introduced to the carbon fiber surface using a plasma treatment in a nitrogen-containing environment, as briefly mentioned above. An example of the plasma treatment is shown by the reaction schemes depicted in FIGS. 4A and 4B. As shown in FIG. 4A, the carbon fiber 120 is exposed to a plasma treatment in a nitrogen-based ($N_2$) environment at room temperature (e.g., 18° C. to 23° C.) to activate the carbon fiber surface 140 with $NH_2$ groups (i.e., to introduce the —$NH_2$ groups onto the surface 140). The surface-treated carbon fiber 120' has an activated carbon fiber surface 140'.

Figure 4B:
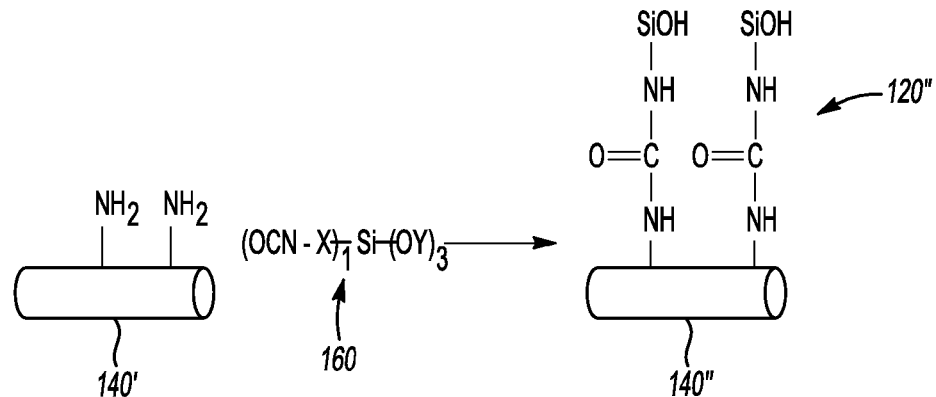

As shown in FIG. 4B, the activated carbon fiber surface 140' is silanized to form a silanized carbon fiber surface 140". In the example shown in FIG. 4B, the silanization step for this example involves reacting the amine groups of the activated carbon fiber surface 140' with a silane 160 to incorporate a silanol moiety (e.g., —SiOH) on the activated carbon fiber surface 140'. An example of the silane for this reaction is OCN—X—Si—OY, where X in this example is a carbon-containing group (e.g., a methylene group, an ethylene group, or a propylene group) and Y is a carbon-containing group (e.g., a methyl group, ethyl group, propyl group, etc.) or hydrogen. Other suitable silanes include those previously described (e.g., in reference to FIG. 1B). This process forms a silanized carbon fiber 120".

Figure 5A:
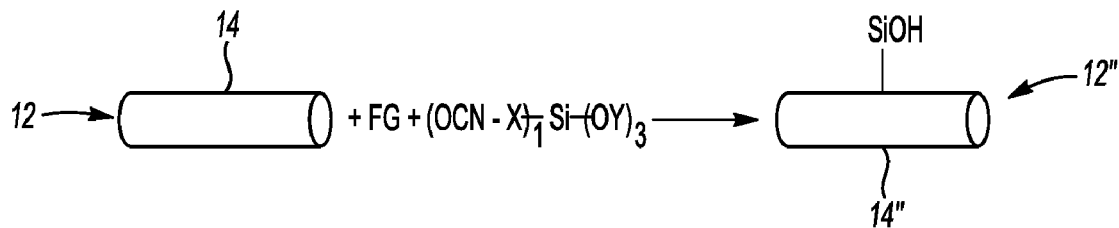
FIGS. 5A through 5C are reaction schemes illustrating an example of a method of making a fiber-reinforced resin, including treating carbon fiber surfaces to introduce a silanol moiety on the surface (FIG. 5A), coating the treated carbon fiber surfaces with a sizing agent to form a resin reinforcing material (FIG. 5B), and incorporating the resin reinforcing material into a matrix resin (FIG. 5C).
Figure 5B:
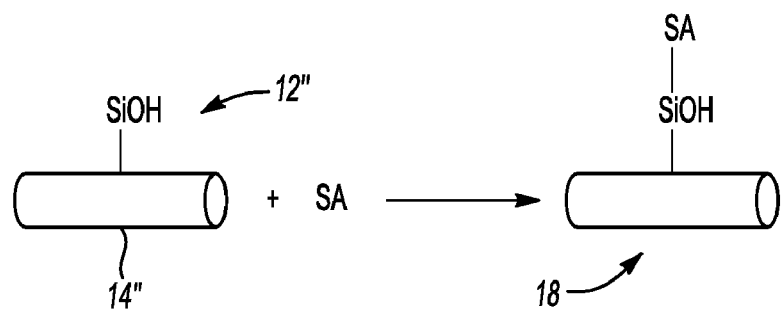

A method of making the carbon fiber-reinforced resin will now be described in conjunction with the reaction schemes schematically illustrated in the FIG. 5 series (i.e., FIGS. 5A, 5B, and 5C). In these figures, it is noted that not all chemical components are shown (e.g., functional groups, hydroxyls, etc.), and that the carbon fiber 12" formed by the reaction schemes shown in FIGS. 1A and 1B are used. It is to be understood that this method may also be applied for the forming the carbon fiber 120" by the reaction schemes shown in FIGS. 4A and 4B. The carbon fiber-reinforced resin may be made, e.g., by treating respective surfaces 14 of carbon fibers 12 by introducing a functional group (FG) onto the surfaces to form the surfaces 14' and functionalized fibers 12', and then incorporating silanol moieties (SiOH) to the functionalized surfaces 14' to form the surface treated carbon fiber surfaces 14" treated carbon fibers 12". These steps are shown as a single step in FIG. 5A, and have been previously described in conjunction with FIGS. 1A and 1B and FIGS. 4A and 4B above.

The treated carbon fibers 12" may then be coated or reacted (e.g., to form a chemical bond) with a sizing agent SA to form a resin reinforcing material 18. This reaction is illustrated in FIG. 5B. This process may be accomplished via dip coating the carbon fibers 12" using a sizing agent bath. The sizing agent SA may be physically coated onto the fibers 12" (e.g., to form a physical bond), or chemically reacted (e.g., to form a chemical bond) with the silanol groups through condensation reactions between the silanol on the carbon fiber surface 14" and the silanol present in the sizing agent.

The sizing agent SA may be chosen from the same surface sizing agents suitable for treating glass fibers. The sizing agents include both film former compounds and coupling agent compounds. Some examples of coupling agents that may be used as (or in) the surface sizing agent SA for the treated carbon fibers 12" include N-β(aminoethyl)-γ-aminopropyl-methyldimethoxy silane, N-β(aminoethyl)-γ-aminopropyl-trimethoxy silane, γ-aminopropyl-triethoxy silane, γ-glycidopropyl-trimethoxy silane, vinyltrimethoxy silane, vinyltriethoxy silane, N-propyl-trimethoxy silane, aminoalkyl silane, γ-methacryloxy-propyl trimethoxy silane, γ-mercaptopropyl trimethoxy silane, and methyltrimethoxy silane. The film former may be chosen from a polymer, some examples of which include polyurethanes, epoxies, polymethyl methacrylate, polycarbonates, rubbers, polyvinyl alcohol, and/or the like.

Figure 5C:
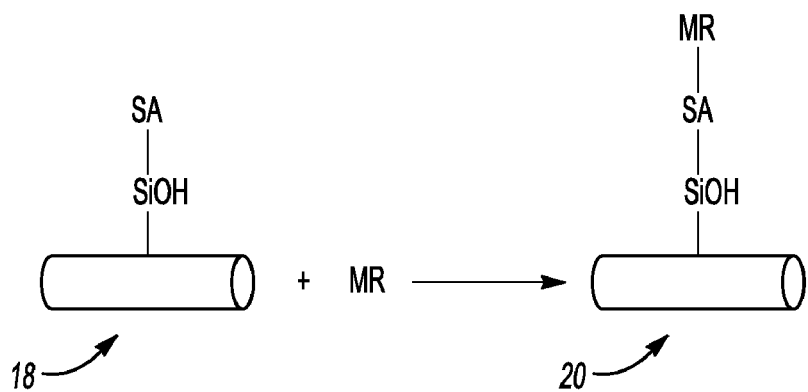

The fiber-reinforced resin 20 is then formed by incorporating the resin reinforcing material 18 into a resin MR, as shown in FIG. 5C. This may be accomplished, e.g., via extruding, pre-pregging, resin transfer modeling, sheet molding, and/or the like. Examples of resins MR to which the fiber reinforcing material(s) 18 is/are added include matrix resins, such as epoxies, polyesters, vinyl esters, polystyrenes, polypropylenes, polyethylenes, polymethyl methacrylate, polycarbonates, polyamides, acrylonitrile butadiene styrene, polyethylene terephthalate, polybutylene terephthalate, poly etherether-ketone, polyetherimides, polyimides, polyethersulfones, polysulfones, and combinations thereof. As shown schematically in FIG. 5C, the sizing agent SA (in particular the coupling agent) bonds the treated carbon fiber 12" to the matrix resin MR.

It is to be understood that the ranges provided herein include the stated range and any value or sub-range within the stated range. For example, an amount ranging from about 1 nm to about 100 μm should be interpreted to include not only the explicitly recited limits of about 1 nm to about 100 μm, but also to include individual amounts, such as 10 nm, 550 nm, 75 μm, etc., as well as sub-ranges. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise, both in the specification and the claims.

While several embodiments have been described in detail, it will be apparent to those skilled in the art that the disclosed embodiments may be modified. Therefore, the foregoing description is to be considered non-limiting.

The invention claimed is:

1. A method for treating carbon fibers, comprising:
   introducing a functional group to a carbon fiber surface, the functional group being chosen from the group consisting of amine groups, carboxyl groups, hydroxyl groups, carbonyls, and combinations thereof; and
   reacting the functional group with a silane to incorporate a silanol moiety to the carbon fiber surface, the silane having an isocyanate group capable of chemically reacting with the functional group introduced to the carbon fiber surface.

2. The method as defined in claim 1 wherein the introducing of the functional group to the carbon fiber surface is accomplished via a chemical, electrochemical, or physical treatment process.

3. The method as defined in claim 1 wherein the silane is chosen from the group consisting of 3-(triethoxysilyl)propyl isocyanate, (trimethoxysilyl)propyl isocyanate, (triethoxysilyl)butyl isocyanate, (triethoxysilyl)ethyl isocyanate, and (triethoxysilyl)methyl isocyanate.

4. A method of making a fiber-reinforced resin, comprising:
   treating respective surfaces of carbon fibers by incorporating a silanol moiety to the surfaces by:
   introducing a functional group to a carbon fiber surface, the functional group being chosen from the group consisting of amine groups, groups containing oxygen, and combinations thereof; and
   reacting the functional group with a silane to incorporate the silanol moiety to the carbon fiber surface, the silane having an isocyanate group capable of chemically reacting with the functional group introduced to the carbon fiber surface;
   reacting the treated carbon fibers with a coupling agent to the form a resin-reinforcing material; and
   incorporating the resin-reinforcing material into a resin.

5. The method as defined in claim 4 wherein the groups containing oxygen are chosen from the group consisting of carboxyl groups, hydroxyl groups, and carbonyl groups.

6. The method as defined in claim 4 wherein the introducing of the functional group to the carbon fiber surface is accomplished via a chemical, electrochemical, or physical treatment process.

7. The method as defined in claim 4 wherein the coupling agent is chosen from the group consisting of N-β(aminoethyl)-γ-aminopropyl-methyldimethoxy silane, N-β(aminoethyl)-γ-aminopropyl-trimethoxy silane, γ-aminopropyl-triethoxy silane, γ-glycidopropyl-trimethoxy silane, vinyltrimethoxy silane, vinyltriethoxy silane, N-propyl-trimethoxy silane, aminoalkyl silane, γ-methacryloxy-propyl trimethoxy silane, γ-mercaptopropyl trimethoxy silane, and methyltrimethoxy silane.

* * * * *